Figure 1:
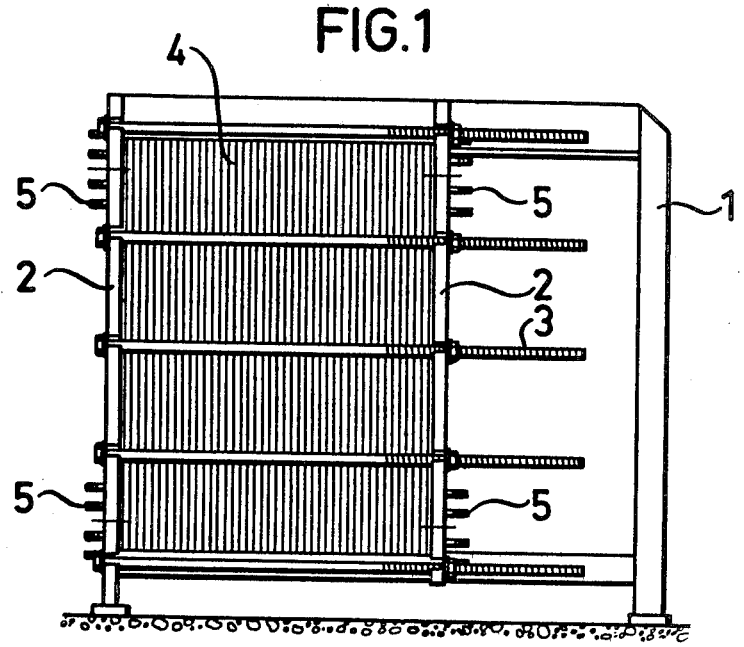

United States Patent [19]

Lindahl et al.

[11] Patent Number: 4,482,089

[45] Date of Patent: Nov. 13, 1984

[54] METHOD OF LINING A FLUID CONNECTION OPENING IN A FRAME PLATE OF A PLATE HEAT EXCHANGER

[75] Inventors: Lars Lindahl, Handen; Bengt Carlsson, Vargön, both of Sweden

[73] Assignee: Reheat AB, Taby, Sweden

[21] Appl. No.: 434,923

[22] Filed: Oct. 18, 1982

[51] Int. Cl.³ ............................................. B23K 31/02
[52] U.S. Cl. ........................... 228/173 C; 29/157.3 D
[58] Field of Search ....................... 29/157.4, 157.3 D; 228/183, 173 C

[56] References Cited

FOREIGN PATENT DOCUMENTS 2357059  9/1978  Fed. Rep. of Germany .

Primary Examiner—Nicholas P. Godici
Assistant Examiner—P. Weston Musselman, Jr.
Attorney, Agent, or Firm—Cushman, Darby & Cushman

[57] ABSTRACT

The invention relates to a method of lining a connection opening for fluid in a frame plate of a plate heat exchanger. A pipe socket with a diameter corresponding to the diameter of the opening is provided with a flange and placed in the opening, and the flange abutting the undepressed area about the opening on the inside of the plate has a thickness not exceeding 1 mm. On the outside of the plate the portion of the socket projecting there is provided with a flange to abut the undepressed area about the opening on the other side of the plate.

6 Claims, 5 Drawing Figures

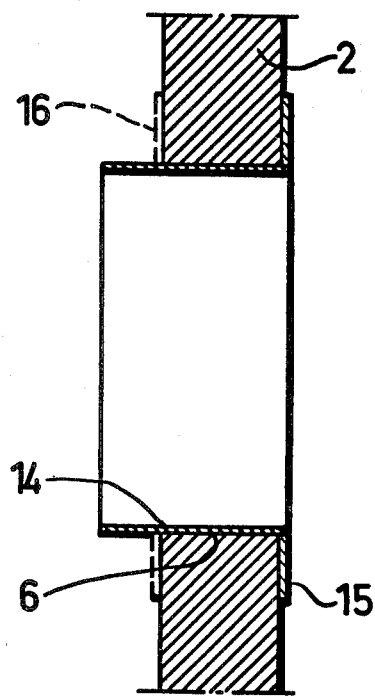
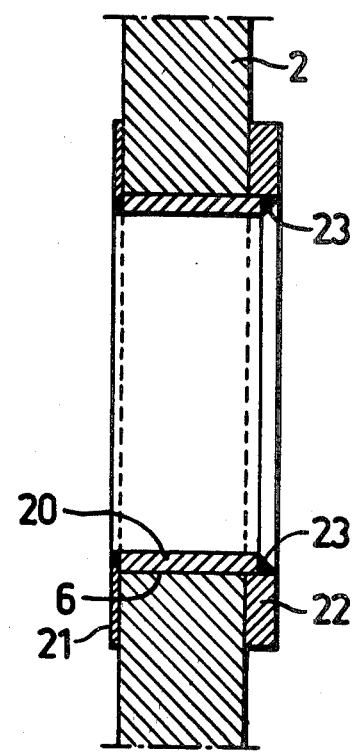
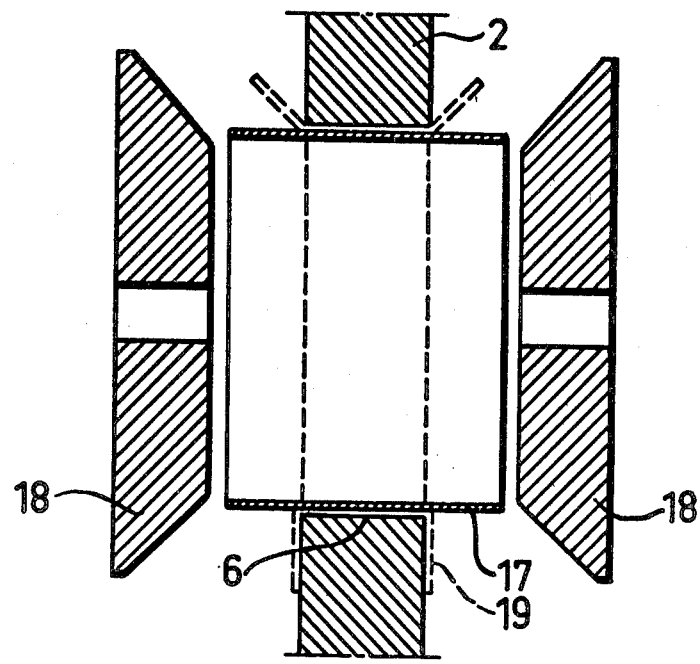

METHOD OF LINING A FLUID CONNECTION OPENING IN A FRAME PLATE OF A PLATE HEAT EXCHANGER

This invention relates to a method of lining the inlet and outlet openings for the fluid flowing through the frame plate of a plate heat exchanger. Normally the heat exchanger plates are manufactured of stainless and acid-resistant steel and titanium in order to withstand attacks from the media flowing through the heat exchanger, which media often are very active. The end wall pieces, which hold together the heat exchanger plates so as to form a package, and which between themselves sealingly press together the plates and are interconnected by boltings, must be capable to take up great loads. They are, therefore, necessarily designed with great dimensions and, consequently, require much material. It is, therefore, economically not realistic to manufacture these frame plates of the same expensive material as the heat exchanger plates, but the frame plates are manufactured of standard pressure-vessel steel, SIS 1330. This implies, that the fluid passageways must be lined sealingly with a special material, which usually is the same as in the heat exchanger plates. In order to seal the material in the frame plate from the fluid, such lining is given the form of a pipe socket, which extends through the opening and on each side of the frame plate is provided with a flange extending to the respective side of the plate. The flange facing to the interior of the heat exchanger is in mounted state of the heat exchanger sealingly pressed by an adjacent heat exchanger plate against the inner surface of the frame plate, and a connecting socket presses the other flange via a bolting against the outer surface of the frame plate.

The inner flange of the lining and the surface of the frame plate, therefore, according to prior art must be located in the same plane in order to ensure correct and sealed abutment of an adjacent heat exchanger plate. This requires machining of the frame plate. Owing to the weight of the frame plate, which in this connection normally can amount to several tonnes, and because the plate is provided with up to four openings, the costs of handling the plate at the machining operation are very high. Large units are machined in boring machines.

The lining is made in the form of a pipe socket, on which in its mounted state the said flanges are welded. This in its turn implies expensive storage, because frame plates with connections of different materials must be available. The present invention as it is defined in the characterizing clauses of the attached claims eliminates the aforesaid high handling and storage costs, and the linings can be mounted on the frame plates in the assembly plant or in situ in connection with the mounting of the heat exchanger.

Figure 2:
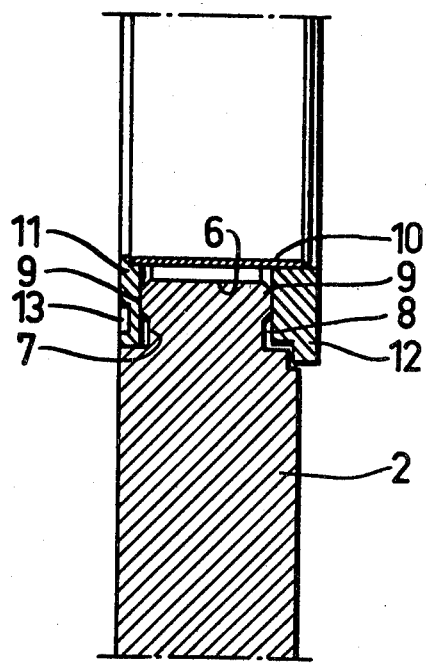

The invention is described in greater detail in the following by way of embodiments and with reference to the accompanying drawings, in which FIG. 1 is a schematic lateral view of a plate heat exchanger, FIG. 2 is a partial section through an embodiment of prior art, FIG. 3 shows a lining according to the invention, FIG. 4 shows a second embodiment of a lining according to the invention, and FIG. 5 shows a third embodiment of a lining according to the invention.

The plate heat exchanger comprises a frame 1, which carries the frame plates 2 and the heat exchanger plates 4, which are sealingly pressed together between said frame plates by means of boltings 3. The numeral 5 designates bolts, by which pipe sockets connecting external circuits to be served by the heat exchanger are screwed on the frame plates.

FIG. 2 shows a known type of lining used for the passage through the frame plate 2. On each side of the plate depressions 7 and 8 are provided about the passage by machining, for example by boring. The respective depression is provided with a sealing strip 9. The lining proper consists of a pipe socket 10 and a flange 11 and 12 on each side of the plate 2. The respective flange is welded on the socket 10. The flange 11, which faces inward to the heat exchanger, i.e. to the adjacent heat exchanger plate, is located with its outer surface in the same plane as the inner surface of the frame plate. The flange 11 is also provided with a packing groove 13.

In FIGS. 3 and 4 a frame plate with lining according to the present invention is shown. The frame plate is provided with a plain passage opening 6 without any depressions. In FIG. 3 a lining is shown which has the form of a pipe socket 14 with an outward beaded flange 15 on one side and is inserted into the opening of the frame plate 2 so that the flange abuts one side of the plate. In this position the portion of the socket 14 projecting on the other side of the plate is beaded out to a flange 16 indicated by dashed lines. This lining preferably is manufactured of the same material as the heat exchanger plates and has a small material thickness, which usually is about 0.6 mm. The lining can be manufactured of circular blanks punched out of sheet metal billets for the heat exchanger plates. It was found that, owing to this configuration of the lining, no depression is required, but the adjacent heat exchanger plate can rest directly against the relatively thin sheet metal flange. In spite of the flange projecting outside the plane of the frame plate, it was surprisingly found that complete sealing is obtained between heat exchanger plate and flange and between flange and frame plate. No detrimental effect on the heat exchanger plates due to the unplaneness formed has been observed, but the plates adapt along the plate package of the heat exchanger by the compressing forces here prevailing.

In FIG. 4 a lining according to the invention is shown in the form of a pipe socket 17, which is attached in the passage opening 6 of the frame plate 2 while at the same time a tool beads out the flanges on each side of the frame plate 2. The tool is shown schematically in the form of a truncated cone-shaped pressing tool 18 on each side of the socket. By suitable means (not shown) the tools 18 are forced against each other and thereby bead out the portions of the socket 17, which are located outside the frame plate 2, to positions upwardly in the Figure indicated by dashed lines. Thereafter the pressing tools 18 preferably can be turned and again be forced against each other whereby the plane sides of the tools 18 now bead out the portions to flanges 19 abutting the frame plate 2 (indicated by dashed lines downwardly in FIG. 4).

In FIG. 5 a third embodiment of the lining according to the invention is shown. On a pipe socket 20 a flange 21 is welded. The flange is made of a sheet metal billet with a thickness not exceeding 1 mm, preferably 0.6–0.8 mm. The pipe socket 20 with the thin flange 21 welded thereon is attached in the passage opening 6. The length of the pipe socket is chosen so that the socket 20 partially extends outside the outer surface of the frame plate 2, as appears from FIG. 5. A second flange 22 with a thickness established in the art and not critical is thereafter attached on the other side of the plate 2 so as to enclose the portion of the pipe socket projecting therefrom and at 23 is welded thereon.

The invention, thus, as described above has rendered it possible to line frame plates of plate heat exchangers with a simple lining of thin sheet metal of the same material as the heat exchanger plates, without requiring expensive depressions in the frame plates about the passage openings. The manufacturing method of the linings and the location of the openings in the frame plates are not a part of the present invention and per se constitute only solutions obvious to the expert within the scope of prior art.

What we claim is:

1. A method of lining a connection opening for fluid in a frame plate of a plate heat exchanger, characterized in that said frame plate has an inside surface, an outside surface and an undepressed area about the connection opening on each side surface of the plate, in that a pipe socket with a diameter corresponding to the diameter of the opening is provided with a flange of thin sheet metal, with a thickness of at maximum 1 mm, and is placed in the opening with the flange abutting the undepressed area about the opening on the inside surface of the plate with a socket portion projecting on the outside of the plate, and in that said socket portion is provided with a flange to abut the undepressed area about the opening on said outside surface of the plate.

2. A method as defined in claim 1, characterized in that the pipe socket is beaded out at one end prior to the attachment of the socket in the opening, with the flange abutting the undepressed area about the opening on one side of the plate.

3. A method as defined in claim 1, characterized in that the pipe socket is attached in the opening, and thereafter projecting portions of the socket on each side of the plate are beaded out simultaneously each to a plane flange abutting the undepressed area about the opening.

4. A method as defined in claim 1, characterized in that the flange of thin sheet metal, at maximum 1 mm thick, is welded on the pipe socket, and after the socket has been attached in the opening, the second flange is welded thereon on the other side of the plate.

5. A method as defined in any one of the preceding claims, characterized in that the flange on the inside surface of the frame plate is clamped sealingly between said plate and the plate member in the plate heat exchanger which is located closest to the frame plate.

6. A method of lining a connection opening for fluid in a frame plate of a heat exchanger, said frame plate having an inner surface facing an adjacent heat exchanger plate and an outer surface facing outwardly of the heat exchanger and being of uniform thickness, said surfaces being planar and said opening having inner and outer edges lying in the planes of said inner and outer surfaces without there being any area of reduced plate thickness surrounding said opening, said method comprising fitting into the opening a metal pipe socket having an outside diameter corresponding to the diameter of the opening and having inner and outer end flanges which abut said inner and outer surfaces of said plate and which thereby project outside the planes of said surfaces, said inner flange being formed of thin sheet metal of 1 mm maximum thickness.

* * * * *